US012122391B2

(12) United States Patent
Kuehner et al.

(10) Patent No.: US 12,122,391 B2
(45) Date of Patent: Oct. 22, 2024

(54) SYSTEMS AND METHODS FOR TRIGGERING LIGHTS REMOTELY TO MEASURE OPERATOR VIGILANCE

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 74 days.

(21) Appl. No.: 18/172,557

(22) Filed: Feb. 22, 2023

(65) Prior Publication Data
US 2024/0278788 A1   Aug. 22, 2024

(51) Int. Cl.
| | |
|---|---|
| *B60W 40/08* | (2012.01) |
| *B60W 50/16* | (2020.01) |
| *B60W 60/00* | (2020.01) |
| *G06V 20/58* | (2022.01) |
| *G06V 20/59* | (2022.01) |
| *B60W 50/14* | (2020.01) |

(52) U.S. Cl.
CPC ............ *B60W 40/08* (2013.01); *B60W 50/16* (2013.01); *B60W 60/0053* (2020.02); *B60W 60/0059* (2020.02); *B60W 60/0061* (2020.02); *G06V 20/584* (2022.01); *G06V 20/597* (2022.01); *B60W 2040/0818* (2013.01); *B60W 2050/143* (2013.01); *B60W 2050/146* (2013.01); *B60W 2420/403* (2013.01); *B60W 2540/229* (2020.02); *B60W 2556/65* (2020.02)

(58) Field of Classification Search
CPC .. B60W 40/08; B60W 50/16; B60W 60/0053; B60W 60/0059; B60W 60/0061; B60W 2040/0818; B60W 2050/143; B60W 2050/146; B60W 2420/403; B60W 2540/229; B60W 2556/65; G06V 20/584; G06V 20/597
See application file for complete search history.

(56) References Cited

U.S. PATENT DOCUMENTS

| | | | | |
|---|---|---|---|---|
| 7,365,769 | B1* | 4/2008 | Mager | G06V 20/58 348/148 |
| 7,427,924 | B2* | 9/2008 | Ferrone | B60K 28/066 180/274 |
| 9,747,812 | B2* | 8/2017 | Misu | G09B 19/167 |
| 9,751,534 | B2* | 9/2017 | Fung | G06V 10/764 |
| 10,252,721 | B1* | 4/2019 | Bai | B60Q 1/508 |
| 11,249,544 | B2* | 2/2022 | Sicconi | G08B 3/1016 |

(Continued)

FOREIGN PATENT DOCUMENTS

| | | |
|---|---|---|
| CN | 111959488 A | 11/2020 |
| CN | 113056749 A | 6/2021 |

(Continued)

*Primary Examiner* — John A Tweel, Jr.
(74) *Attorney, Agent, or Firm* — Christopher G. Darrow; Darrow Mustafa PC (57) ABSTRACT

System, methods, and other embodiments described herein relate to implementing operator vigilance tests. In one embodiment, a method includes sending from a first vehicle a light activation request to a second vehicle; detecting a light activation by the second vehicle via the first vehicle; and determining a measure of operator vigilance in the first vehicle based on a vehicle operator response to the light activation.

20 Claims, 5 Drawing Sheets

(56) References Cited

U.S. PATENT DOCUMENTS

| | | | |
|---|---|---|---|
| 11,770,677 B1* | 9/2023 | Lesesky | H04W 4/48 |
| | | | 455/456.1 |
| 2006/0244632 A1 | 11/2006 | Corcoran | |
| 2007/0040666 A1 | 2/2007 | Lenehan | |
| 2010/0156617 A1* | 6/2010 | Nakada | A61B 5/18 |
| | | | 340/439 |
| 2015/0266414 A1 | 9/2015 | Bailey et al. | |
| 2016/0362111 A1* | 12/2016 | Jones | G08B 21/06 |
| 2019/0357834 A1* | 11/2019 | Aarts | A61B 5/7246 |
| 2020/0125117 A1 | 4/2020 | Switkes et al. | |
| 2020/0312155 A1 | 10/2020 | Kelkar et al. | |
| 2022/0094435 A1 | 3/2022 | Yamamoto et al. | |

FOREIGN PATENT DOCUMENTS

| | | |
|---|---|---|
| DE | 102018125215 A1 | 4/2019 |
| EP | 2677510 B1 | 12/2013 |
| FR | 2926511 A1 | 7/2009 |
| FR | 3016572 A2 | 7/2015 |
| JP | 5664445 B2 | 2/2015 |

\* cited by examiner

SYSTEMS AND METHODS FOR TRIGGERING LIGHTS REMOTELY TO MEASURE OPERATOR VIGILANCE

TECHNICAL FIELD

The subject matter described herein relates, in general, to operator vigilance, and, more particularly, to evaluating vehicle operator responses to remotely triggered lights, such as brake lights.

BACKGROUND

Vehicles may be equipped with automated driving assistance systems. The specific operating domain(s) in which an automated driving assistance system is designed to properly operate, which may be defined with respect roadway types, speed range, environmental conditions (weather, daytime/nighttime, etc.), or other constraints, may be referred to as an operational design domain. If an automated driving assistance system detects an exit from its operational design domain, the automated driving assistance system typically makes a takeover request to the vehicle operator, after which the vehicle operator is expected to take manual control of the vehicle.

SUMMARY

In one embodiment, example systems and methods relate to a manner of implementing operator vigilance tests.

In one embodiment, a vigilance evaluator system is disclosed. The vigilance evaluator system includes one or more processors and a memory communicably coupled to the one or more processors. The memory stores a command module including instructions that when executed by the one or more processors cause the one or more processors to send from a first vehicle a light activation request to a second vehicle; detect a light activation by the second vehicle via the first vehicle; and determine a measure of operator vigilance in the first vehicle based on a vehicle operator response to the light activation.

In one embodiment, a non-transitory computer-readable medium including instructions that when executed by one or more processors cause the one or more processors to perform one or more functions is disclosed. The instructions include instructions to send from a first vehicle a light activation request to a second vehicle; detect a light activation by the second vehicle via the first vehicle; and determine a measure of operator vigilance in the first vehicle based on a vehicle operator response to the light activation.

In one embodiment, a method for implementing operator vigilance tests is disclosed. In one embodiment, the method includes sending from a first vehicle a light activation request to a second vehicle; detecting a light activation by the second vehicle via the first vehicle; and determining a measure of operator vigilance in the first vehicle based on a vehicle operator response to the light activation.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with implementing operator vigilance tests are disclosed herein. In various implementations of takeover processes, a vehicle operator may undertake a takeover without complete mental readiness. For example, the operator might not be vigilant or engaged sufficiently for control after the takeover due to sleeping, watching a movie, or being engaged in texting. Accordingly, operator vigilance tests are described herein that may be implemented after a takeover.

For example, a light activation request may be sent to an ado vehicle ahead of the ego vehicle, wherein the request is to activate the ado vehicle's brake lights. Once the ego vehicle may detect the light activation, the ego vehicle may monitor for a vehicle operator response and may determine a measure of operator vigilance based on such a response. If the measure of operator vigilance does not satisfy one or more criteria, the takeover may be deemed invalid; an alert may be generated; or both. Such an approach may be beneficial when used in combination with automated driving assistance (e.g., level 2, level 3, level 4).

Figure 1:
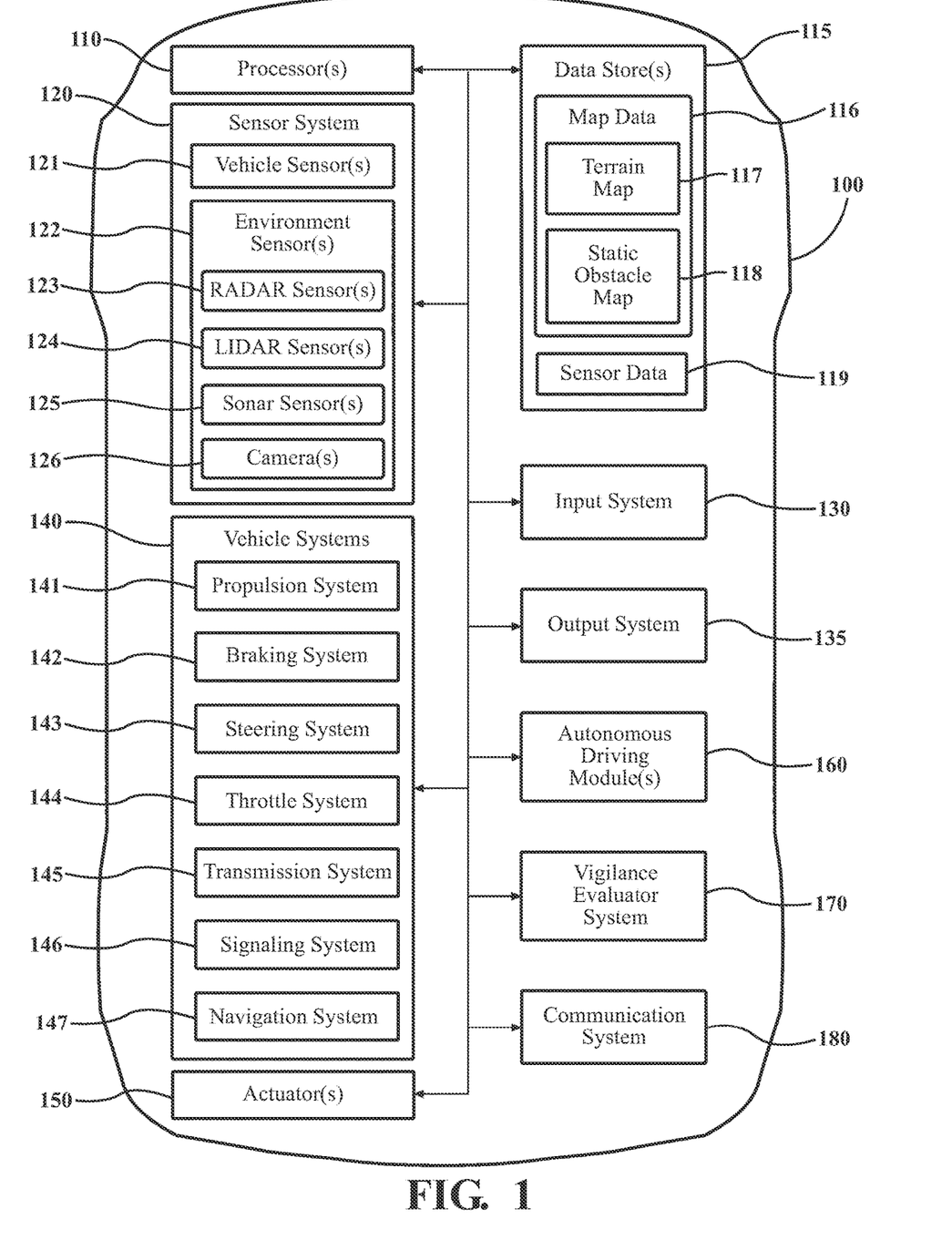
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with estimating operator vigilance. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment or other system that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a vigilance evaluator system 170 that is implemented to perform methods and other functions as disclosed herein relating to implementing operator vigilance tests. As will be discussed in greater detail subsequently, the vigilance evaluator system 170, in various embodiments, is implemented partially within the vehicle 100, and as a cloud-based service. For example, in one approach, functionality associated with at least one module of the vigilance evaluator system 170 is implemented within the vehicle 100 while further functionality is implemented within a cloud-based computing system.

Figure 2:
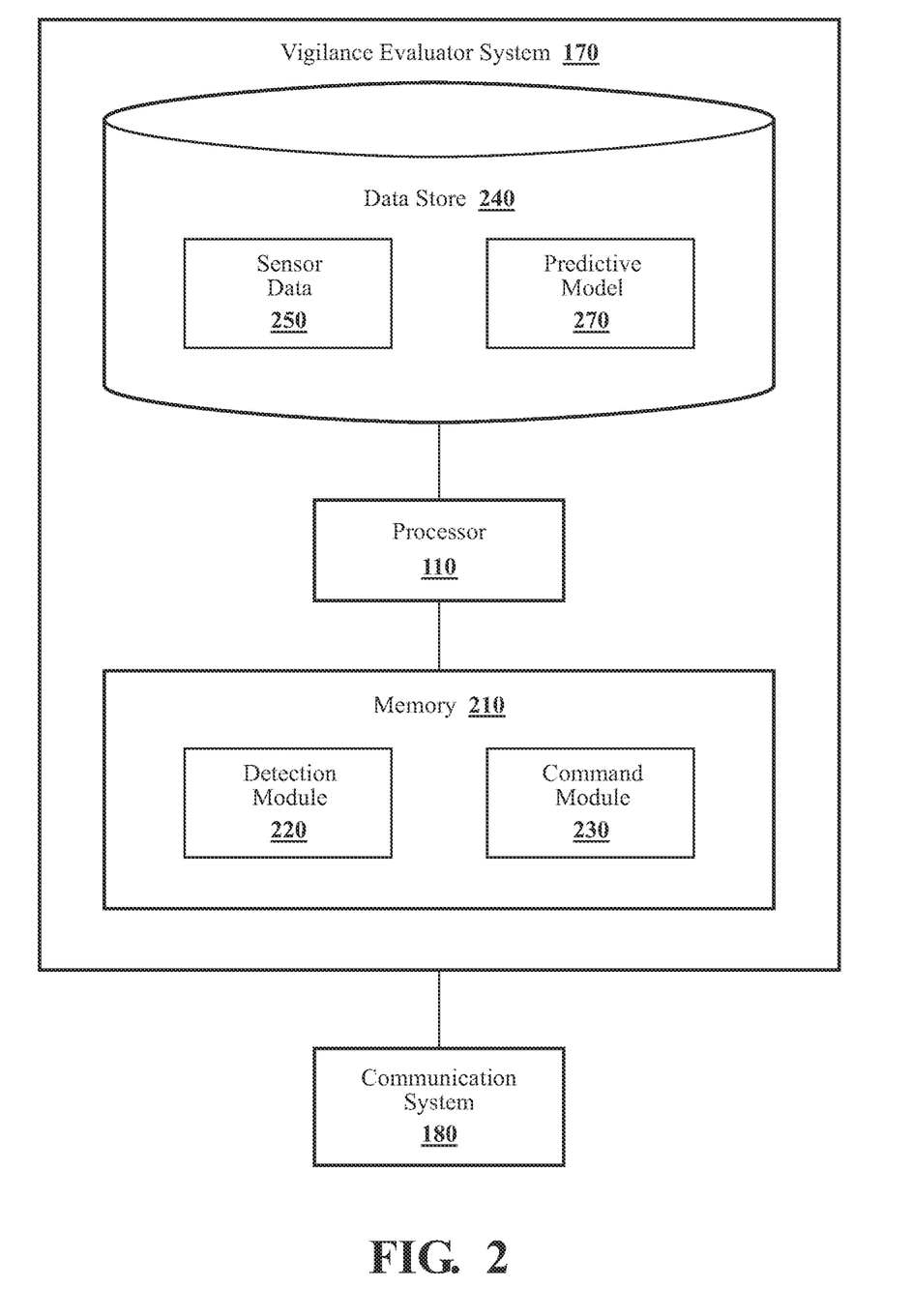
FIG. 2 illustrates one embodiment of a vigilance evaluator system that is associated with implementing operator vigilance tests.

With reference to FIG. 2, one embodiment of the vigilance evaluator system 170 of FIG. 1 is further illustrated. The vigilance evaluator system 170 is shown as including a processor 110 from the vehicle 100 of FIG. 1. Accordingly, the processor 110 may be a part of the vigilance evaluator system 170, the vigilance evaluator system 170 may include a separate processor from the processor 110 of the vehicle 100, or the vigilance evaluator system 170 may access the processor 110 through a data bus or another communication path. In one embodiment, the vigilance evaluator system 170 includes a memory 210 that stores a detection module 220 and a command module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
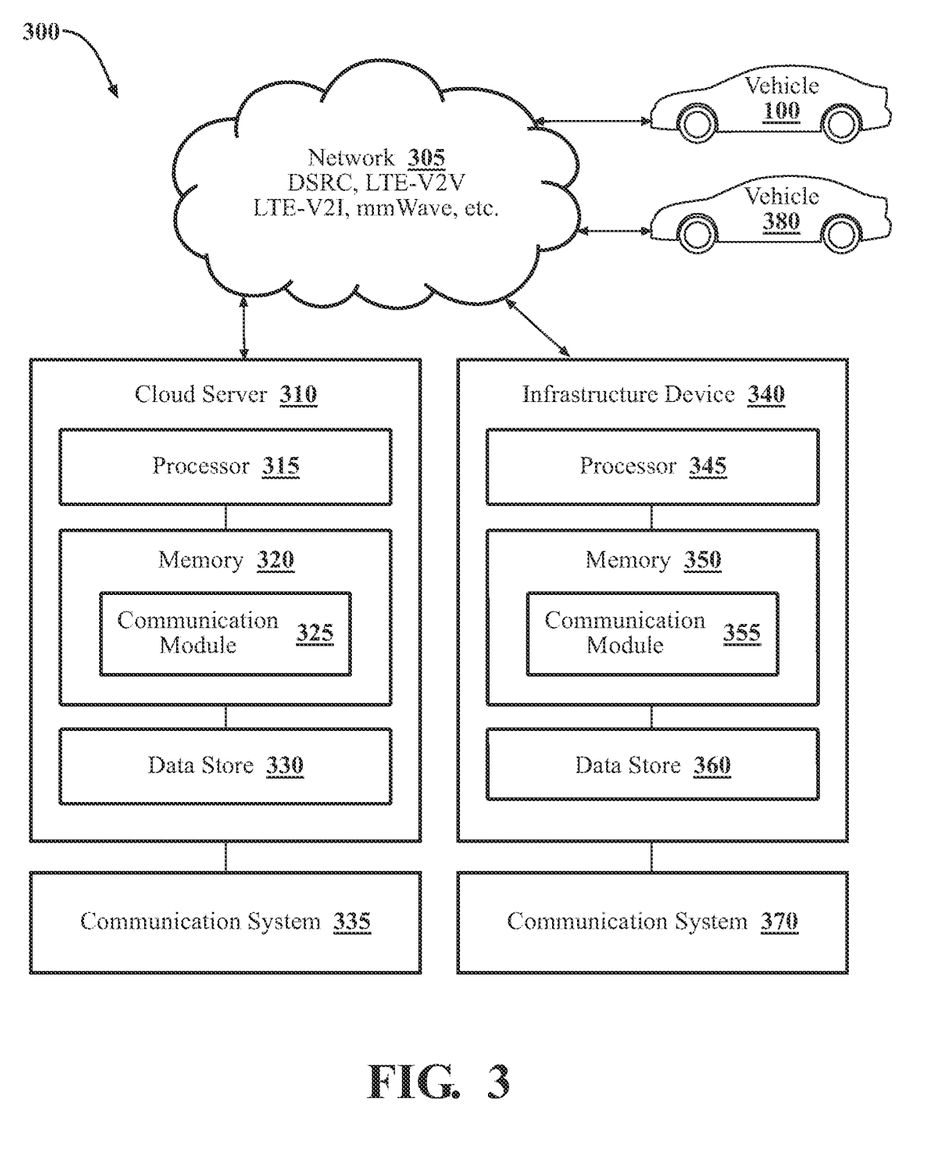
FIG. 3 illustrates one embodiment of the vigilance evaluator system of FIG. 2 in a cloud-computing environment.

The vigilance evaluator system 170 as illustrated in FIG. 2 is generally an abstracted form of the vigilance evaluator system 170 as may be implemented between the vehicle 100 and a cloud-computing environment. FIG. 3, which is further described below, illustrates one example of a cloud-computing environment 300 that may be implemented along with the vigilance evaluator system 170. As illustrated in FIG. 3, the vigilance evaluator system 170 may be embodied at least in part within the cloud-computing environment 300.

With reference to FIG. 2, the detection module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires sensor data 250 that includes at least camera images. In further arrangements, the detection module 220 acquires the sensor data 250 from further sensors such as a radar 123, a LiDAR 124, and other sensors as may be suitable for identifying vehicles and locations of the vehicles. In one embodiment, detection module 220 may also acquire sensor data 250 from one or more sensors that allow for estimating operator vigilance.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceptions acquired from multiple sensors.

In addition to locations of surrounding vehicles, the sensor data 250 may also include, for example, information about lane markings, and so on. Moreover, the detection module 220, in one embodiment, controls the sensors to acquire the sensor data 250 about an area that encompasses 360 degrees about the vehicle 100 in order to provide a comprehensive assessment of the surrounding environment. Of course, in alternative embodiments, the detection module 220 may acquire the sensor data about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the vigilance evaluator system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on.

The detection module 220, in one embodiment, is further configured to perform additional tasks beyond controlling the respective sensors to acquire and provide the sensor data 250. For example, the detection module 220 includes instructions that cause the processor 110 to detect light activation from other vehicles or devices based on sensor data 250. For example, detection module 220 may use sensor data 250 to determine the timing, color, information content (e.g., text or images), location (e.g., rear brake light, turning signal, high-beams) or other characteristics of a light activation by another vehicle or device.

In one embodiment, the command module 230 generally includes instructions that function to control the processor 110 or collection of processors in the cloud-computing environment 300 for implementing operator vigilance tests.

In some embodiments, command module 230 may determine a disengagement event based on weather conditions, such as where expected fog, rain, or snow at a location ahead may likely cause difficulties with camera-based automated driving assistance. In some embodiments, command module 230 may determine a disengagement event based on traffic conditions, such as where expected traffic congestion at a location ahead may impair the ability to provide automated driving assistance. In some embodiments, command module 230 may determine a disengagement event based on the vehicle being predicted to exit an operational design domain. In some embodiments, command module 230 may determine a disengagement event based on time, such as when sunset or sunrise may occur, and calculate a location where the disengagement is expected to occur based on vehicle parameters, traffic data, or other factors.

In some embodiments, command module 230 may generate a takeover request based on a disengagement event. In some embodiments, command module 230 may issue a notification using visual, auditory, haptic, or other means indicating to the vehicle operator that he or she should take over control of the vehicle. In some embodiments, a light activation request may be generated as described herein in conjunction with a takeover request notification.

In some embodiments, command module 230 may detect a takeover by a vehicle operator. For example, command module 230 may evaluate steering, braking, acceleration, or other vehicle operator inputs to determine if a takeover has occurred. In some embodiments, a takeover may also be evaluated as a vehicle operator response in response to a light activation by another vehicle or device as described herein.

In some embodiments, command module 230 may send a light activation request to another vehicle. For example, command module 230 may send a light activation request to another vehicle travelling in front of vehicle 100 with a request to trigger its brake lights. In some embodiments, a light activation request may contain a sender ID (e.g., the ego vehicle), receiver ID (e.g., the ado vehicle, an infrastructure device), security data (e.g., to prevent hacking), timing/synchronization data (e.g., to ensure that the light activation occurs at a specified time between sender and receiver), light device type (e.g., brake lights, high-beams, right turn signal), a light function (e.g., turn on for 5 seconds), or other information relating to such a request.

In some embodiments, a light function within a light activation request may specify the behavior of a light device. For example, a light function may specify the intensity, color, visual content (e.g., text or images), or other visual data relating to the appearance of a light device. As another example, a light function may contain operating instructions, such as instructions relating to timing (e.g., activate in 5 seconds, then turn off after ten seconds) or other behavior of the light device (e.g., flash lights, high intensity modulation of light device, low intensity modulate of light device, color changes, text/image changes). In some embodiments, the light function may specify a condition that must be satisfied before light activation may occur (e.g., vehicle safely completes lane change).

In some embodiments, command module 230 may receive a light activation request from another vehicle. For example, command module 230 may receive a light activation request from another vehicle travelling behind vehicle 100 with a request to trigger vehicle 100's brake lights. In some embodiments, command module 230 may send in response to a light activation request a light activation acknowledgement. In some embodiments, a light activation acknowledgement may contain a sender ID, receiver ID, security data, timing/synchronization data, light device type, a light function, or other information relating to such an acknowledgement.

In some embodiments, command module 230 may determine whether a light activation request may be implemented. For example, command module 230 may check that other vehicles other than the requesting vehicle are within a certain distance of vehicle 100. As another example, command module 230 may check whether vehicle systems 140 can carry out the light activation request (e.g., can the light device support the requested color?). As yet another example, command module 230 may check whether the light activation request is permitted by a third-party entity (e.g., a cloud server 310). In some embodiments, if a check passes, command module 230 may determine that the light activation request can be implemented, whereas if the check fails, command module 230 may determine that the light activation request cannot be implemented. In some embodiments, if the check fails, command module 230 may determine a substitute light activation (e.g., flickering for 5 seconds not supported, will leave on for 5 seconds). In some embodiments, the light activation acknowledgement may contain results of a determination on whether to implement the light activation request (e.g., yes, no—another vehicle/pedestrian in area, no—cannot support requested light type/function; yes—modification of request required as follows). In some embodiments, where a modification of a light activation request occurs, multiple light activation requests and acknowledgements may be exchanged to reach agreement on any modifications.

In some embodiments, upon determining that a light activation request may be implemented, command module 230 may instruct vehicle systems 140 to carry out the light activation request. For example, based on the light type within a light activation request, command module 230 may instruct brake lights, turn signals, headlights, display panels, or other light devices to carry out a light function. In some embodiments, such as where command module 230 is configured to operate an infrastructure device, command module 230 may instruct light devices of the infrastructure device to carry out a light function. In some embodiments, command module 230 may implement a pre-determined function with respect to instructing a light device to operate, such as where a light activation request does not contain a light function.

With reference to FIG. 3, vehicle 100 may be connected to a network 305, which allows for communication between vehicle 100 and cloud servers (e.g., cloud server 310), infrastructure devices (e.g., infrastructure device 340), other vehicles (e.g., vehicle 380), and any other systems connected to network 305. With respect to network 305, such a network may use any form of communication or networking to exchange data, including but not limited to the Internet, Directed Short Range Communication (DSRC) service, LTE, 5G, millimeter wave (mmWave) communications, and so on.

The cloud server 310 is shown as including a processor 315 that may be a part of the vigilance evaluator system 170 through network 305 via communication unit 335. In one embodiment, the cloud server 310 includes a memory 320 that stores a communication module 325. The memory 320 is a random-access memory (RAM), read-only memory (ROM), a hard-disk drive, a flash memory, or other suitable memory for storing the module 325. The module 325 is, for example, computer-readable instructions that when executed by the processor 315 cause the processor 315 to perform the various functions disclosed herein. Moreover, in one embodiment, cloud server 310 includes the database 330. The database 330 is, in one embodiment, an electronic data structure stored in the memory 320 or another data store and that is configured with routines that can be executed by the processor 315 for analyzing stored data, providing stored data, organizing stored data, and so on.

The infrastructure device 340 is shown as including a processor 345 that may be a part of the vigilance evaluator system 170 through network 305 via communication unit 370. In one embodiment, the infrastructure device 340 includes a memory 350 that stores a communication module 355. The memory 350 is a random-access memory (RAM), read-only memory (ROM), a hard-disk drive, a flash memory, or other suitable memory for storing the module 355. The module 355 is, for example, computer-readable instructions that when executed by the processor 345 cause the processor 345 to perform the various functions disclosed herein. Moreover, in one embodiment, infrastructure device 340 includes the database 360. The database 360 is, in one embodiment, an electronic data structure stored in the memory 350 or another data store and that is configured with routines that can be executed by the processor 345 for analyzing stored data, providing stored data, organizing stored data, and so on.

Accordingly, in addition to information obtained from sensor data 250, vigilance evaluator system 170 may obtain information from cloud servers (e.g., cloud server 310), infrastructure devices (e.g., infrastructure device 340), other vehicles (e.g., vehicle 380), and any other systems connected to network 305. For example, network 305 may be used to convey light activation requests and light activation acknowledgements.

In some embodiments, command module 230 may detect a light activation by another vehicle or device. In some embodiments, command module 230 may detect a light activation by another vehicle or device based on sensor data 250. For example, detection module 220 may record image data from a camera, then process the image data to record any light activations and its characteristics within sensor data 250, such as the activation of a brake light from a vehicle ahead of vehicle 100, including the start of said activation. Command module 230 may then after a light activation request check sensor data 250 to see if/when the requested light activation occurred. In some embodiments, command module 230 may detect a light activation by another vehicle or device based on a light activation acknowledgement. For example, a light activation acknowledgement may specify when to expect the light activation to start or may denote when it was implemented.

In some embodiments, command module 230 may determine a vehicle operator response based on a light activation by another vehicle or device. For example, command module 230 may evaluate steering, braking, acceleration, or other vehicle operator inputs to determine if an operator response occurred. In some embodiments, command module 230 may set thresholds or other criteria for evaluating vehicle operator inputs to determine if a vehicle operator response occurred (e.g., brake pedal activated—yes/no, reduced speed by at least 5 mph—yes/no). As another example, command module 230 may obtain from sensor data 250 information describing the behavior of the vehicle operator (e.g., eye gaze tracking) for evaluating a vehicle operator response. In some embodiments, command module 230 may set thresholds or other criteria for evaluating vehicle operator behavior to determine if a vehicle operator response occurred (e.g., did the driver look at the light device—yes/no).

In some embodiments, command module 230 may determine a measure of operator vigilance based on a vehicle operator response to a light activation by another vehicle. In some embodiments, command module 230 may analyze the time between the detection of a light activation and the start of a vehicle operator response to determine a measure of operator vigilance. In some embodiments, command module 230 may analyze the time between the detection of a light activation and the point at which a vehicle operator response reaches a desired threshold to determine a measure of operator vigilance. In some embodiments, command module 230 may analyze the characteristics of the vehicle operator response inputs (e.g., intensity of the response) to determine a measure of operator vigilance. In some embodiments, command module 230 may analyze the behavioral information regarding the vehicle operator response (e.g., how long did the driver look at the light device before braking) determine a measure of operator vigilance. In some embodiments, command module 230 may assign a measure of operator vigilance if command module 230 did not determine a vehicle operator response to have occurred (e.g., the lowest score possible).

In some embodiments, command module 230 may determine that a takeover did not properly occur based on a measure of operator vigilance arising from a light activation request.

In embodiments where the light activation request occurs as part of the takeover notification, command module 230 may use a measure of operator vigilance arising from the light activation request in determining whether a takeover occurred. For example, command module 230 may send a light activation request in conjunction with a takeover request (e.g., requesting that a vehicle ahead double pulse its brake lights as if encountering traffic congestion, which may be the cause for the disengagement). In such an example, if the vehicle operator reacts poorly to the light activation (e.g., where the measure of operator vigilance fails to satisfy one or more criteria), the resulting measure of operator vigilance may be relied on by command module 230 to not allow a takeover despite other vehicle operator control inputs. Such an example may be implemented, for instance, to detect whether a vehicle operator is even looking ahead when attempting a takeover (e.g., such as where only steering inputs are detected).

In embodiments where the light activation request is issued subsequent to a takeover, command module 230 may evaluate a measure of operator vigilance arising from a light activation by another vehicle to evaluate if the vehicle operator is actually in sufficient control of the vehicle. For example, command module 230 may implement the double-pulse brake light activation request as above, except after the takeover. In such an example, if the vehicle operator reacts poorly to the light activation (e.g., where the measure of operator vigilance fails to satisfy one or more criteria), the resulting measure of operator vigilance may be relied on by command module 230 to negate the takeover. Such an example may be implemented, for instance, to detect whether a tired vehicle operator is "zoned out" and merely acting to follow the vehicle ahead after the takeover.

In some embodiments, once command module 230 determines that a takeover did not occur or properly occur, command module 230 may return the vehicle to automated driving assistance (e.g., semi-autonomous control, autonomous control). If automated driving assistance is not available, command module 230 may instruct the vehicle to place the vehicle in a safe state (e.g., reducing speed to zero and moving the vehicle to the shoulder if possible).

In some embodiments, command module 230 may issue an alert based on the measure of operator vigilance. For example, a measure of operator vigilance arising from a light activation request may be above a first threshold that would negate a takeover, but below a second alert threshold requiring an alert be given to the vehicle operator. In some embodiments, command module 230 may issue an alert using visual, auditory, haptic, or other means that may increase operator vigilance (e.g., white noise alarm, shaking steering wheel). In some embodiments, command module 230 may disable vehicle features based on an alert, such as audio/visual playback of media.

It should be appreciated that the command module 230 in combination with a prediction model 270 can form a computational model such as a machine learning logic, deep learning logic, a neural network model, or another similar approach. In one embodiment, the prediction model 270 is a statistical model such as a regression model that determines measures of operator vigilance based on sensor data 250 or other sources of information as described herein. Accordingly, the model 270 can be a polynomial regression (e.g., least weighted polynomial regression), least squares or another suitable approach.

Moreover, in alternative arrangements, the prediction model 270 is a probabilistic approach such as a hidden Markov model. In either case, the command module 230, when implemented as a neural network model or another model, in one embodiment, electronically accepts the sensor data 250 as an input, which may also include evaluation metrics. Accordingly, the command module 230 in concert with the prediction model 270 produce various determinations/assessments as an electronic output that characterizes the noted aspect as, for example, a single electronic value. Moreover, in further aspects, the vigilance evaluator system 170 can collect the noted data, log responses, and use the data and responses to subsequently further train the model 270.

Figure 4:
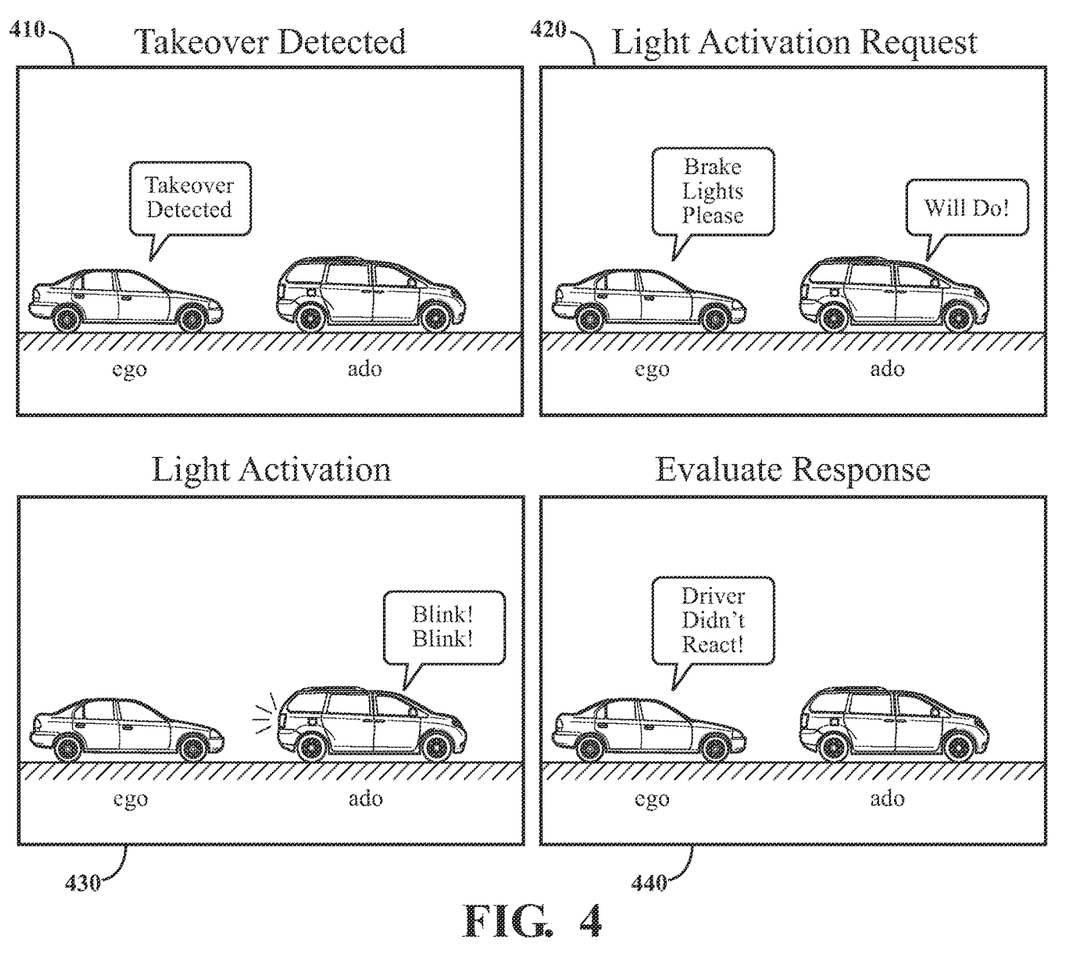
FIG. 4 illustrates one example of implementing operator vigilance tests.

With respect to FIG. 4, an example of implementing an operator vigilance test using a light activation request is shown. At 410, an event such as takeover may be detected, which may be a trigger for performing an operator vigilance test. At 420, the ego vehicle sends a light activation request to the ado vehicle ahead to activate the ado's brake lights, which is then confirmed by the ado vehicle via a light activation acknowledgement. At 430, the ado activates its brake lights as requested and may further communicate the activation to the ego vehicle. At 440, the ego vehicle may evaluate the vehicle operator's response and determine if the vehicle operator has displayed sufficient vigilance.

While FIG. 4 provides an example of using a light activation request after a takeover is detected, in some embodiments a light activation request may occur as part of a takeover request. For example, a vehicle approaching a traffic jam may determine that a takeover request is necessary. Further, the automated driving assistance may also determine that a reduction in speed is desired as part of the takeover. Accordingly, when the takeover request is sent a light activation request may also be sent to another vehicle to activate its lights (e.g., pulsing brake lights, flashing headlights) to indicate a need to reduce speed. In such an embodiment, the vehicle operator's response (e.g., applying braking as part of the takeover) to the light activation may then be used to evaluate a measure of operator vigilance.

In some embodiments, a light activation request may also be used in contexts other than takeover requests to measure operator vigilance. For example, if command module 230 detects that the vehicle operator of a semi-truck seeks to make a lane change (e.g., by engaging a turn signal), it may send a light activation request to an autonomous semi-truck in target lane to flash its headlights when sufficient room is available for the lane change. Based on when the vehicle operator makes the lane change (e.g., before the light activation, after the light activation), command module 230 may determine a measure of operator vigilance. As another example, command module 230 may seek to warn a vehicle operator to reduce speed due to a serious road hazard ahead. Accordingly, command module 230 may issue a light activation request to an oncoming vehicle to flash their headlights. Based on how the vehicle operator responds to the light activation (e.g., slowing down, maintaining vehicle speed), command module 230 may determine a measure of operator vigilance.

Figure 5:
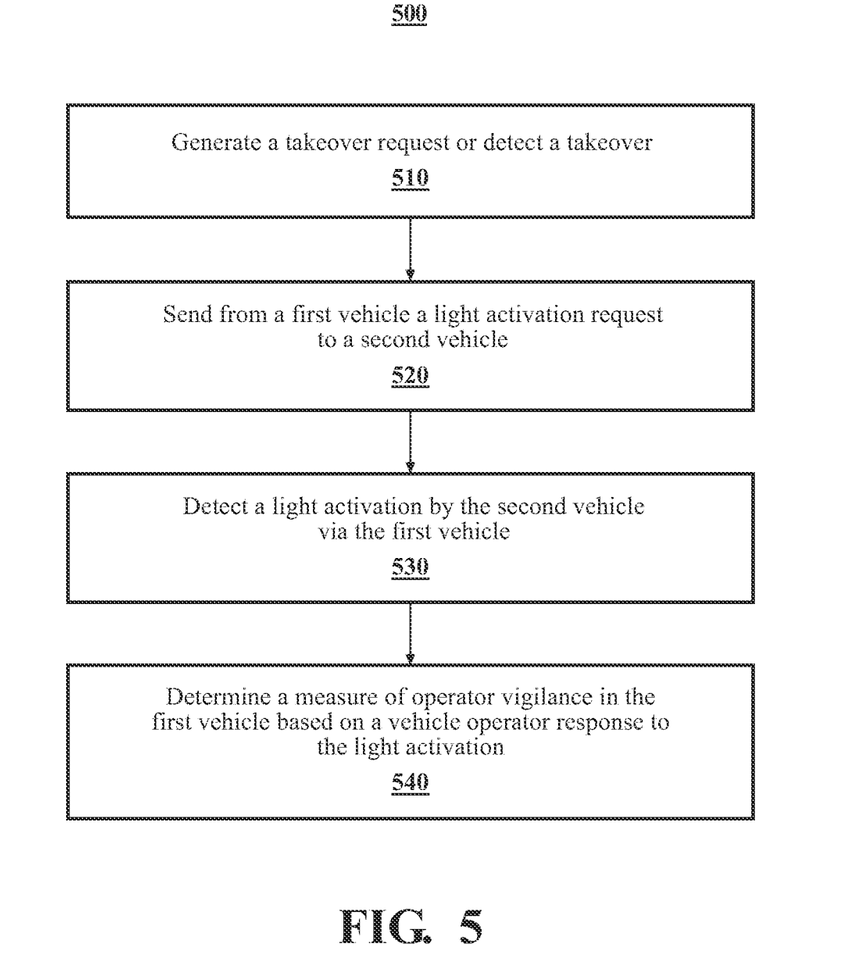
FIG. 5 illustrates one embodiment of a method for using a vigilance evaluator system for implementing operator vigilance tests.

Additional aspects of implementing operator vigilance tests will be discussed in relation to FIG. 5. FIG. 5 illustrates a flowchart of a method 500 that is associated with implementing operator vigilance tests. Method 500 will be discussed from the perspective of the vigilance evaluator system 170 of FIGS. 1 and 2. While method 500 is discussed in combination with the vigilance evaluator system 170, it should be appreciated that the method 500 is not limited to being implemented within the vigilance evaluator system 170 but is instead one example of a system that may implement the method 500.

At 510, command module 230 may generate a takeover request or detect a takeover. For example, command module 230 may generate a takeover request based on a potential disengagement event. As another example, command module 230 may evaluate steering, braking, acceleration, or other vehicle operator inputs to determine if a takeover has occurred.

At 520, command module 230 may send from a first vehicle a light activation request to a second vehicle. For example, command module 230 may send a light activation request to another vehicle travelling in front of vehicle 100 with a request to trigger its brake lights. In some embodiments, the light activation request may contain a sender ID, receiver ID, security, timing/synchronization data, light device type, a light function, or other information relating to such a request.

In some embodiments, the light function may specify the behavior of a light device as may be specified by the light device type. For example, a light function may specify the intensity, color, visual content, or other visual data relating to the appearance of a light device. As another example, a light function may contain operating instructions, such as instructions relating to timing or other behavior of the light device.

In some embodiments, the light activation request may be sent in conjunction with a takeover request. In some embodiments, the light activation request may be sent after the takeover is detected.

At 530, command module 230 may detect a light activation by the second vehicle via the first vehicle. In some embodiments, command module 230 may detect a light activation by another vehicle or device based on sensor data 250. For example, detection module 220 may record image data from a camera, then process the image data to record any light activations and its characteristics within sensor data 250, such as the activation of a brake light from a vehicle ahead of vehicle 100, including the start of said activation. Command module 230 may then after a light activation request check sensor data 250 to see if/when the requested light activation occurred. In some embodiments, command module 230 may detect a light activation by another vehicle or device based on a light activation acknowledgement. For example, a light activation acknowledgement may specify when to expect the light activation to start or may denote when it was implemented.

At 540, command module 230 may determine a measure of operator vigilance in the first vehicle based on a vehicle operator response to the light activation. For example, command module 230 may analyze the time between the detection of a light activation and the start of a vehicle operator response to determine a measure of operator vigilance. In some embodiments, command module 230 may analyze the time between the detection of a light activation and the point at which a vehicle operator response reaches a desired threshold to determine a measure of operator vigilance. In some embodiments, command module 230 may analyze the characteristics of the vehicle operator response inputs to determine a measure of operator vigilance. In some embodiments, command module 230 may analyze the behavioral information regarding the vehicle operator response to determine a measure of operator vigilance. In some embodiments, command module 230 may assign a measure of operator vigilance if command module 230 did not determine a vehicle operator response to have occurred (e.g., the lowest score possible).

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vigilance evaluator system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the vigilance evaluator system 170, and/or the automated driving module(s) 160 may control some or all of these vehicle systems 140 and, thus, may be partially or fully autonomous.

The processor(s) 110, the vigilance evaluator system 170, and/or the automated driving module(s) 160 can be operatively connected to communicate with the various vehicle systems 140 and/or individual components thereof. For example, returning to FIG. 1, the processor(s) 110, the vigilance evaluator system 170, and/or the automated driving module(s) 160 can be in communication to send and/or receive information from the various vehicle systems 140 to control the movement, speed, maneuvering, heading, direction, etc. of the vehicle 100. The processor(s) 110, the vigilance evaluator system 170, and/or the automated driving module(s) 160 may control some or all of these vehicle systems 140.

The processor(s) 110, the vigilance evaluator system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the vigilance evaluator system 170, and/or the automated driving module(s) 160 can control the direction and/or speed of the vehicle 100. The processor(s) 110, the vigilance evaluator system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the vigilance evaluator system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. In general, the automated driving module(s) 160 may function to implement different levels of automation, including advanced driving assistance (ADAS) functions, semi-autonomous functions, and fully autonomous functions. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The automated driving module(s) 160 can be configured can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a processor; and
a memory communicably coupled to the processor and storing machine-readable instructions that, when executed by the processor, cause the processor to:
send from a first vehicle a light activation request to a second vehicle;
detect a light activation by the second vehicle via the first vehicle; and
determine a measure of operator vigilance in the first vehicle based on a vehicle operator response to the light activation.

2. The system of claim 1, wherein the machine-readable instructions further include instructions that, when executed by the processor, cause the processor to:
generate a takeover request; and
detect whether a takeover has occurred.

3. The system of claim 2, wherein the machine-readable instruction to detect whether the takeover has occurred is subsequent to the light activation request being sent.

4. The system of claim 3, wherein the vehicle operator response to the light activation is based at least in part on a detected takeover.

5. The system of claim 2, wherein the machine-readable instruction to detect whether the takeover has occurred is prior to the light activation request being sent.

6. The system of claim 5, wherein the machine-readable instructions further include an instruction that, when executed by the processor, cause the processor to invalidate the takeover if the measure of operator vigilance fails to satisfy one or more criteria.

7. The system of claim 5, wherein the machine-readable instructions further include an instruction that, when executed by the processor, cause the processor to generate an alert if the measure of operator vigilance fails to satisfy one or more criteria.

8. The system of claim 1, wherein the machine-readable instruction to detect the light activation by the second vehicle via the first vehicle is evaluated based on one or more messages between the first vehicle and the second vehicle.

9. A non-transitory computer-readable medium including instructions that when executed by one or more processors cause the one or more processors to:
   send from a first vehicle a light activation request to a second vehicle;
   detect a light activation by the second vehicle via the first vehicle; and
   determine a measure of operator vigilance in the first vehicle based on a vehicle operator response to the light activation.

10. The non-transitory computer-readable medium of claim 9, wherein the instructions further include instructions that when executed by the one or more processors cause the one or more processors to:
   generate a takeover request; and
   detect whether a takeover has occurred.

11. The non-transitory computer-readable medium of claim 10, wherein the instruction to detect whether the takeover has occurred is subsequent to the light activation request being sent.

12. The non-transitory computer-readable medium of claim 11, wherein the vehicle operator response to the light activation is based at least in part on a detected takeover.

13. The non-transitory computer-readable medium of claim 10, wherein the instruction to detect whether the takeover has occurred is prior to the light activation request being sent.

14. The non-transitory computer-readable medium of claim 13, wherein the instructions further include instructions that when executed by the one or more processors cause the one or more processors to invalidate the takeover if the measure of operator vigilance fails to satisfy one or more criteria.

15. The non-transitory computer-readable medium of claim 13, wherein the instructions further include instructions that when executed by the one or more processors cause the one or more processors to generate an alert if the measure of operator vigilance fails to satisfy one or more criteria.

16. A method, comprising:
   sending from a first vehicle a light activation request to a second vehicle;
   detecting a light activation by the second vehicle via the first vehicle; and
   determining a measure of operator vigilance in the first vehicle based on a vehicle operator response to the light activation.

17. The method of claim 16, further comprising:
   generating a takeover request; and
   detecting whether a takeover has occurred.

18. The method of claim 17, wherein detecting whether the takeover has occurred takes place prior to the light activation request being sent.

19. The method of claim 18, further comprising invalidating the takeover if the measure of operator vigilance fails to satisfy one or more criteria.

20. The method of claim 18, further comprising generating an alert if the measure of operator vigilance fails to satisfy one or more criteria.

* * * * *